March 24, 1942.　　C. L. COLBERT　　2,277,073
METHOD AND APPARATUS FOR TREATING GRANULAR MATERIALS
Filed April 3, 1937　　3 Sheets-Sheet 1
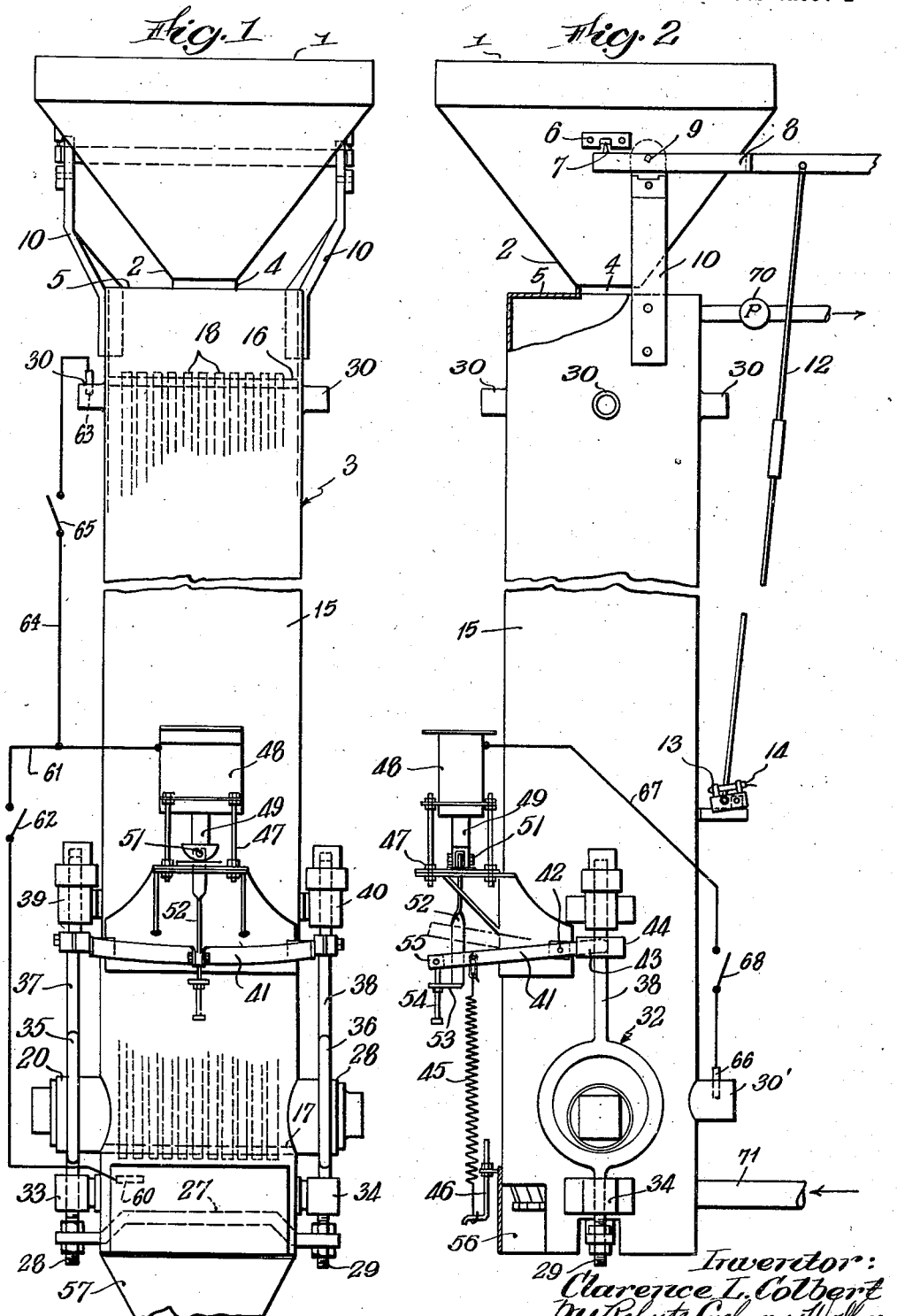

March 24, 1942.  C. L. COLBERT  2,277,073
METHOD AND APPARATUS FOR TREATING GRANULAR MATERIALS
Filed April 3, 1937  3 Sheets-Sheet 2

Inventor
Clarence L. Colbert,
By Roberts, Cushman & Woodbury
Attys.

March 24, 1942.  C. L. COLBERT  2,277,073

METHOD AND APPARATUS FOR TREATING GRANULAR MATERIALS

Filed April 3, 1937  3 Sheets-Sheet 3

Inventor:
Clarence L. Colbert
by Roberts, Cushman & Woodbury
Attys.

Patented Mar. 24, 1942

2,277,073

UNITED STATES PATENT OFFICE 2,277,073

METHOD AND APPARATUS FOR TREATING GRANULAR MATERIALS

Clarence L. Colbert, Elizabeth, N. J., assignor to Fiske Brick & Granule Company, Boston, Mass., a corporation of Massachusetts Application April 3, 1937, Serial No. 134,832

7 Claims. (Cl. 62—104)

This invention relates to a method of and apparatus for making, and more particularly for cooling, granular materials, such as the granules customarily applied to sheet roofing, and the like.

In the manufacture of many granular materials, a heating operation is involved in which the granular mass acquires a high temperature. Owing to the granular nature of such a mass, it ordinarily will not lose this heat promptly. Nevertheless, it may be highly desirable that the temperature of the mass should fall rapidly, after the function which the heating is to serve has been accomplished. The importance of such rapid loss of heat will be appreciated when it is remembered that granular masses characteristically present an extensive surface area relative to the volume or mass of the material, and that this entire surface is contacted with and permeated by the atmosphere or other gases which, at such elevated temperatures, are usually extremely active both chemically and physically. Again, this porosity or extensive volume of pore space, which is filled with dead, heated air, itself constitutes an effective insulation of the mass and there is but little opportunity for conduction, convection or radiation of heat, either through or from the mass.

For example, in making roofing granules by various processes, a heating operation is involved either to determine the color of the granules or to develop the strength and hardness of the materials from which they are made, or other purposes. One method of making such granules comprises the preliminary steps of crushing clay or shale, which is preferably susceptible to hardening by heat, and then screening or otherwise separating the crushed material into granules of the desired size or range of sizes.

The granular material as thus obtained (or with the addition of suitable coloring agents) is next fed through a furnace, which may be of the rotary or multiple hearth type, for example, and heated to a sufficient degree to develop the hardness of the granules, and also under such conditions as to preserve the natural color of the granules or to impart the desired coloration thereto, according to the natural material of which it is made or the coloring agents which have been added. This may be effected in a single heat treatment or separate heating treatments may be employed. In either case, it is not usually desirable to expose the hot granules directly to the atmosphere. For, if this is done, the outer surfaces of the charge will be cooled quickly in contact with the cold atmosphere while the interior of the mass cools slowly, and away from the atmosphere. In consequence of such cooling, the mass will be of variable composition, characteristics, and appearance, from the outside to the inside. The same would be true if the mass were spread out into a thin layer, for the outer parts of the mass would be exposed to the atmosphere and the inner parts would not be so exposed.

Slow cooling of granules in bulk or piles generally effects a difference in color between the granules on the outside and the granules in the interior of the mass or pile. In order to preserve a definite color or shade, which is one of the objects of the heat treatment, the granules must be cooled quickly in the atmosphere in which the color has been developed. This sudden cooling serves to fix the shade or color.

It is accordingly an object of this invention to provide a method and means for treating and more particularly for cooling heated granular materials, so as to develop, promote and preserve uniformity of the same. It is also an object to provide for the rapid and yet controlled uniform cooling of the granular mass, preferably in a continuous operation. It is a further object to provide for the quick cooling of both the granules and the interstitial atmosphere or gases associated therewith, preferably without displacing these gases with other gases until the granules are cooled, or by displacing them with inert gas or a partial vacuum.

Other objects will appear from the following disclosure.

In accordance with the present invention, the heated granular material is fed uniformly from the heating operation or apparatus to form one or more extended streams of uniform, relatively small cross section, and these streams of granules are contacted with cooling surfaces which preferably enclose the several streams, and may, in turn, be cooled by a suitable cooling medium, such as water or air, etc. In this way the heated granules, together with the occluded heated gases associated with them, are uniformly withdrawn from this previous treatment, without displacement of the heated air or gas, which is more or less in equilibrium with the granule surfaces. And this mass of granules and heated gas, as converted into the form of a moving stream of small cross section, may be cooled by radiation, convection and conduction of the contained heat to its outer boundaries and thence to adjacent heat-conducting cooling surfaces or walls, over or against which the stream moves or by which the stream is enclosed. In such small cross sections, and assisted by the relatively active agitation and movement of the granules, the associated gases not only are permitted to circulate around and between the granules, and to the cooler retaining walls, under the influence of differential heating and cooling actions thereon, but are positively agitated and driven through such circulation by the forward pouring and tumbling movement of the granules themselves. At the same time the heat transmitted to the walls retaining such streams of granules may be transmitted rapidly from the retaining walls which are cooled on their outer sides by a circulating cooling medium, such as air or water, or both, or other suitable medium.

In this way the hot gas already associated with the granules is made to serve as a factor in cooling them, by conveying heat from the granules in the stream to the surrounding wall which is maintained at a lower, cooling temperature. But the gas could be positively withdrawn from the granules if desired (preferably countercurrent to the stream) and the stream of granules would then be cooled by conduction and radiation of their heat to the withdrawn gas and to the cooling walls, rather than by local convection currents. Of course, in such procedure cooled inert gases could be admitted to the stream, as the contained air or gases are withdrawn from the spaces between the granules, but preferably only at such points as the lowered temperature and other conditions of the granules would permit.

Granular masses cooled in this way (i. e., by passing through a passage between cooled retaining walls) not only have their temperature reduced rapidly and continuously, but, in respect of the granules severally, the characteristics of the cooling curve or temperature and surrounding gaseous conditions, through which they pass, are substantially the same for each granule. The invention accordingly not only increases the possible output of the heating apparatus employed and obviates the necessity of other apparatus and the provision of extensive space for cooling operations, but renders the product of high quality and uniform in its general characteristics, such as hardness, strength, composition, surface characteristics, color, and the like. The product therefore is both improved and more dependable in respect of the desired qualities which it has acquired in its previous treatment.

A representative instance of carrying out the invention will be described with reference to apparatus for cooling roofing granules, as illustrated in the accompanying drawings, in which:

Fig. 1 is a front view, with parts broken away, of a vertical gravity feed cooling device;

Fig. 2 is a similar side view of the same;

Figure 3:
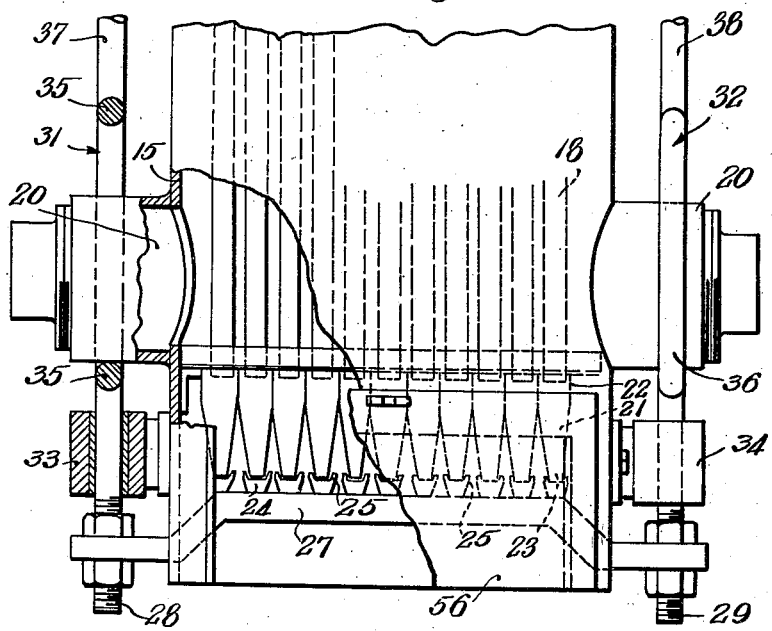
Fig. 3 is an enlarged view of the lower portion of the device as shown in Fig. 1.
Figure 4:
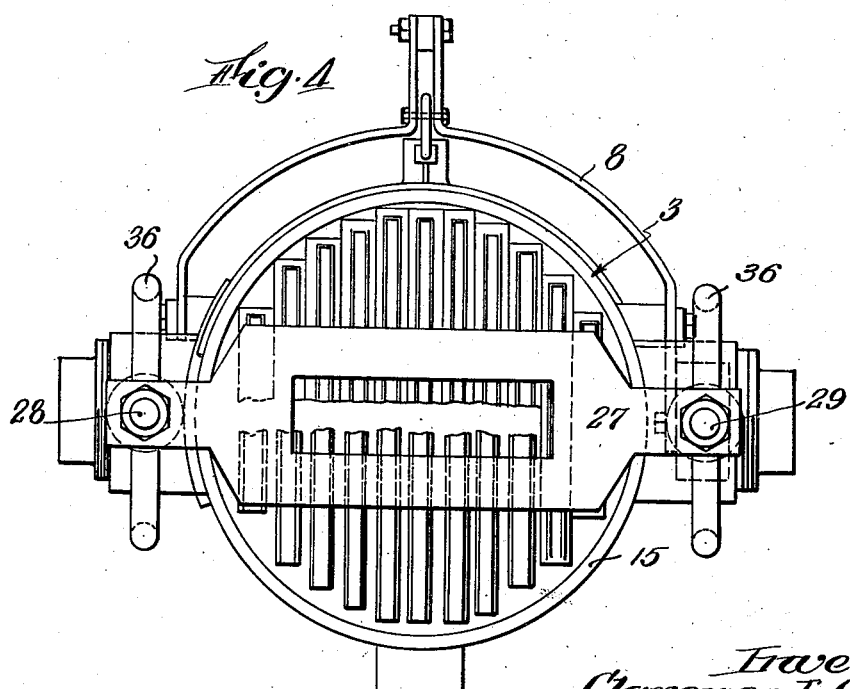
Fig. 4 is a worm's eye view of the bottom of the device with parts broken away to show details of construction.

In the manufacture of roofing granules, as above described, the granules of clay or shale, or like suitable materials, may be subjected to the heating treatment in a rotary type of kiln or in a multiple hearth kiln or furnace, or equivalent heating device. The temperature attained by the granules in such operations, may be of the order of 1500° to 2200° F. and it may be desirable to withdraw them from and check the heat treatment at such temperatures. The atmosphere of the heating unit is usually controlled in respect of its oxidizing or reducing characteristics and if so it will usually be desirable to preserve these characteristics of the gases surrounding the granules. To this end the outlet from the kiln or furnace (not shown) will be hermetically connected to the hopper shown at the top of Fig. 1. If the desired atmosphere is altogether oxidizing in character this will not ordinarily be necessary.

In operation, the heated granules will be delivered from such other apparatus as may be employed for the heating or other treatments involved. Such apparatus is not shown in the drawings. If the granules should not be exposed even momentarily to the atmosphere, they will be delivered through a closed conduit or the like to the device illustrated. If brief contact with the atmosphere is not detrimental or if the tendency is for the heated gases to escape through such openings, tight closures may not be necessary, in such cases.

In the apparatus illustrated the heated granules are delivered to the hopper 1, which preferably tapers toward the bottom 2, from which they flow by gravity into the top of the cylinder 3, through an opening of approximately the same size 4, through the otherwise closed cover or lid 5. A convenient mounting for the hopper may be afforded by providing lugs 6, at opposite sides, which rest on pins 7 attached to one end of each arm 8 of a bifurcated lever which is supported by pivot 9 on support 10. On its free end the lever may carry a counterweight (not shown) about equal to the weight of the hopper plus a suitable charge of heated granules therein. By this arrangement, if the granules are fed to the hopper too rapidly the hopper becomes too heavy, overbalances the counterweights and raises the rod 12 attached to the lever 8 and in turn operates the mercury switch 13 to close or open an electric circuit in the wires 14 and, by well-known electrical devices, to actuate means for reducing or stopping the feed of heated granules to the apparatus, or simply to give warning that an excess of granules has accumulated in the hopper.

As thus regulated, the hopper is adapted to provide a controlled stream of hot granules from the hopper into the top of the cooling appararatus. The cylinder or tower 3, comprises a cylindrical sheet iron drum 15 or the like, with headers 16, at the top, and 17 near the bottom tightly joined to the inner surface of the drum 15, at their peripheries and also to the outsides of a plurality of tubes 18, which are passed vertically through corresponding holes in the headers 16 and 17. The tubes 18 are of suitable diameter to receive freely the granular materials on which the apparatus is designed to operate and to permit continuous uniform passage of a stream of such hot granules therethrough, by gravity. The materials of which the tubes are made will be such as to avoid too great wear by the falling granules on the one hand and also to prevent discoloration or other effects upon the granules. For many granular materials ordinary iron or steel tubes will be satisfactory. For others stainless steel, aluminum, or like suitable materials may be used, and in general, other things considered, materials of high heat conductivity will be preferred. And where water is to be used as a cooling medium, the tubes should be impermeable.

Figure 5:
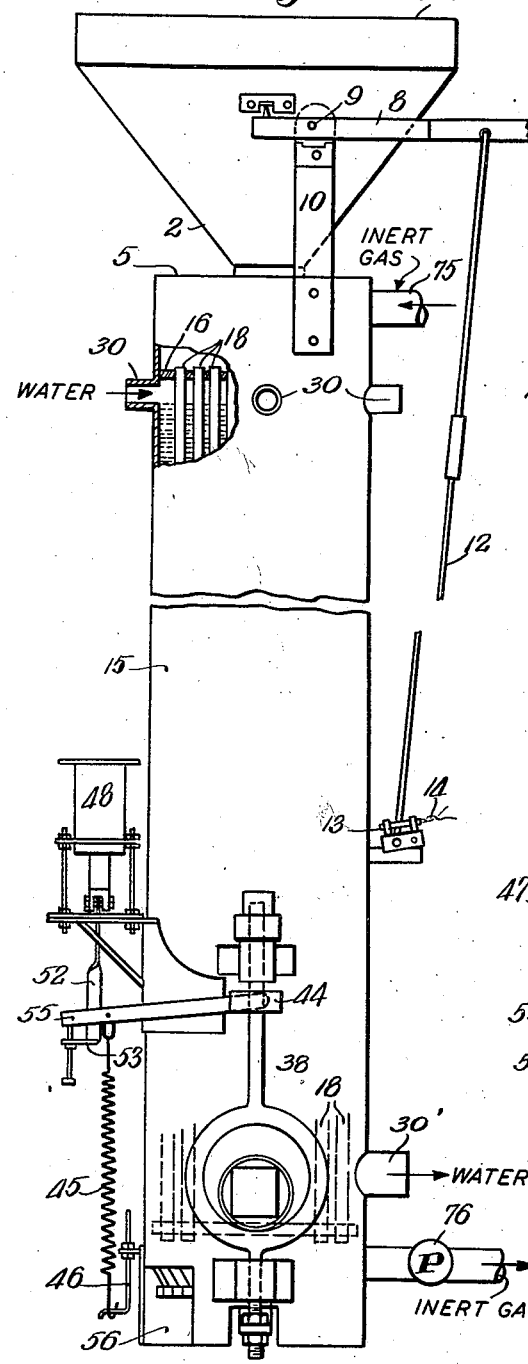
Fig. 5 is a side view similar to Fig. 2, with parts broken away, showing the circulation of cooling water.

The spaces between the vertical tubes 18 and within the cylindrical drum 15, serve to receive and permit the circulation of the cooling medium, which may conveniently be either water or air. If the former, it will ordinarily be introduced through inlet pipes 30 at opposite sides and near the top, and expelled through pipes 30' at opposite sides and near the bottom of the drum. This will provide a downward course of water between the pipes and a downward course for the streams of granules through the pipes, by gravity, as illustrated in Fig. 5—by means of the arrow marked "Water" entering the pipe 30 and the adjacent portion of the drum 15 being broken away—and the arrow marked "Water" leaving the pipe 30'.

Figure 6:
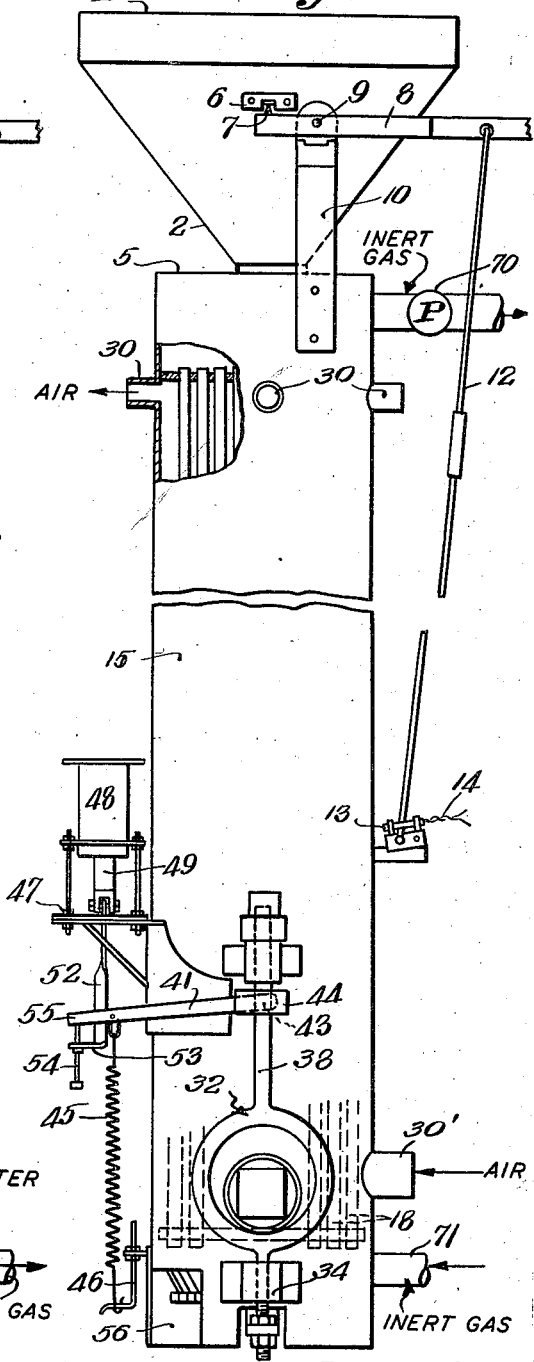
Fig. 6 is a similar side view, showing the circulation of cooling air.

Of course, air may be used as a cooling medium and similarly forced or drawn through the drum, as in a countercurrent from bottom to top. This is illustrated in Fig. 6 by the arrow marked "Air" and pointing inwardly of the pipe 30' and the arrow marked "Air" and pointing outwardly of the pipe 30. In such cases, porous tubes may be used and if the current of air is forced through under pressure the air may also penetrate through the walls of the porous tubes and into the granule streams. If drawn through the drum, as by suction, it will usually be in a countercurrent direction to the flow of granules and the air or gases surrounding the granules in the granule streams may be withdrawn from the granules, passing out through the porous walls of the tubes and, mixing with cooling air from the inlets, be passed therewith through the outlet. For such procedures substantially the same form of apparatus will be used, a blower or suction fan being used for air in place of the pump for water, and attached to the inlet or outlet of the drum as the case may be. The greater volume and speed of the cooling air required, however, would, of course, necessitate much larger equipment than when cooling water is employed.

The charge of hot granules, delivered to the apparatus from the hopper, spreads out over the open tops of the vertical tubes or the granules may be positively spread over such area by a revolving agitator arm mounted within the top of the cylinder above the tubes (not shown). In this way, the granules are divided up into uniform streams which fall by gravity into and through the vertical tubes 18. At the bottom 23 openings of these tubes there are provided long narrow rectangular troughs 21 having wide openings 22 at the top, into each of which project the ends of a row of the tubes 18 (Fig. 3). The bottoms of these rectangular troughs are narrower than the tops and are also open.

In this way, the streams of granules from a number of tubes converge, and this restriction may be so gauged as to check an altogether free fall of granules through the tubes.

Placed beneath the bottom of each trough 21 is a bar or trough 24 having low longitudinal sides 25. These bars or troughs are mounted upon a bridge member 27 passing transversely across the bottom of the cylinder 15, and supported at each end by screw-threaded ends 28, 29 of members 31, 32 which pass vertically upward through guideways 33, 34 and have ring-shaped sections 35, 36 (which pass around the washout plugs 20) above which the upper ends 37, 38 of the members pass through guideways 39, 40, thus permitting vertical movement up and down in these guideways, to raise and lower the bridge member 27 accordingly.

An arcuate member 41 is pivoted near its ends at 42 to the sides of the drum, while the ends 43 may be pivoted to (or slidably engage) lugs 44 mounted on the upper ends 37, 38 of the members 31, 32. The center of the arcuate member 41 is held down by the tension spring 45 attached thereto and adjustably attached to the side of the drum through the slidable or screw-threaded rod 46. This tends to depress the outer end of the arcuate member 41 and through its lever action upon the vertical members 31, 32 to hold the bridge member 27 and the shallow troughs 24 thereon firmly against the open bottoms of the troughs 21; and thus prevent the outward flow of granules. Since the lower ends of the tubes 18 project into the troughs 21, as soon as the accumulated granules in the troughs 21 cover the ends of the tubes 18 further flow of granules from the tubes will cease.

To provide for definitely regulating the opening of the troughs and hence to control the outward flow of granules from the trough 21 and through the tubes 18, a bracket 47 is mounted upon the side of the drum wall carrying a solenoid chamber 48, the core of which 49 projects downwardly and is pivotally connected at 51 with a bar 52 which at its lower end has an offset 53 carrying a screw-threaded pin 54, the end of which bears upon the under surface of lug 55 in the center of the arcuate member 41.

The solenoid 48 may be actuated by an electric current, in the usual way, and either automatically at uniformly spaced time intervals or in accordance with the temperature of the incoming or outgoing stream of granules, the cooling medium of air or water, or by the rate of flow of granules through the apparatus, or a combination of these factors, as desired. Thus (Figs. 1 and 2), a pyrometer thermocouple 60 may be mounted above the bridge member 27, so as to be within the path of the outcoming streams of granules, with a connecting line 61 to the solenoid 48, having a switch 62, to be closed when this mode of control is to be employed. Likewise a pyrometer thermocouple 63 may be mounted in the pipe 30, with connecting line 64, and switch 65, to solenoid 48, and a pyrometer thermocouple 66 in the pipe 30' connecting line 67 and a switch 68, to solenoid 48, through which to control the flow of granules in accordance with the temperature of incoming and/or outgoing cooling medium, whether water or air.

The operation of the device will be readily understood, for while the spring 45 tends to keep the bridge member 27 raised and the troughs 21 closed, as above described, when the solenoid is actuated the core 49 is drawn upwardly and raises the arcuate member 41 from the position shown in solid lines, possibly to the position shown in dotted lines, or other predetermined position, which in turn depresses the vertical members 31, 32, which lower the bridge 27 vertically a corresponding distance and thus open the space between the shallow troughs 24 and the open bottoms of the troughs 21, and thus commence or increase the rate of flow of granules therefrom, by gravity. By cutting off or reversing the actuating current through the solenoid, the reverse operation is effected by the retraction of spring 45 or the downward thrust of the core 49 or both, and the opening is correspondingly closed. By adjustment of the screw-threaded pin 54 (the degree of movement of the solenoid being always the same), the movement of the member 41 may be regulated, and, accordingly, the amount by which the bridge member 27 is lowered and the granule exits between the bottoms 23 of the troughs 21 and the tops of troughs 24 are opened, is regulated.

A removable section of the drum wall or door is provided near the bottom as at 56, whereby the outcoming streams of granules may be reached for observation, test or removal. The granules fall directly into a hopper 57 from which they may be conducted to storage bins (not shown) or packaged directly for shipment.

With such apparatus and by such procedure, granular materials may be withdrawn from heat treatments and cooled to room temperature or such other temperatures as may be desired or required by the material in question without vitiating the desired effects of the heat treatment by deleterious conditions of cooling. The effect may be solely that of quickly lowering the temperature of the granules and of the gas or gases associated therewith; or it may be that of quickly lowering the temperature of the granules and withdrawing such gases (as through porous tubes by suction) or by drawing them off through a pump 70 (Fig. 2); or of admitting additional gases, such as air or inert gases, to offset the contraction of cooling of the contained gases (as through porous tubes with or without pressure) as through the inlet 71 indicated by the arrow in Fig. 2, and in any event the cooling effect is hastened and the desired properties and qualities of the granular material are either preserved or enhanced. The gases associated with the granules may be both pumped out from the spaces around them, by means of the pump 70 and by introducing inert gases through inlet 71, as shown in Fig. 6, which thus pass upwardly through the granules coming down through the tubes 18, in countercurrent relationship. Or the inert gas may be introduced at the top of the column above the header 16, as in the inlet 75, shown in Fig. 5, and withdrawn by the suction pump 76 connected to the space beneath the header 17 at the bottom of the column, where the granules come out from the tubes 18, as illustrated in Fig. 5. In this case the inert gas passes downwardly with the streams of cooling granules. And likewise the cooling water, being introduced through pipe 30 and withdrawn through pipe 30' (Fig. 5) flows downwardly around the outsides of the tubes 18, and hence in the same direction as the granule streams. Moreover, the output of a given set of equipment for the heat treatment of granules is greatly increased because hot granules can not be conveniently or safely handled or stored. And as above pointed out such materials are normally effectively resistant to the loss of temperature, en masse. By the expressions (a) "inert gases" and (b) "reactive gases," as used in the specification, claims and drawings, are to be understood those gases which, if brought into contact with the hot granules at any stage of the cooling treatment, would (a) be without appreciable effect upon the granules or (b) tendency to react with them deleteriously to affect their desirable properties, such as color, structure, etc., respectively.

I claim:

1. Method of cooling hot mineral granular materials comprising the step of conducting heated granules and the hot gases associated therewith into the form of an extended stream, causing the stream to flow in contact with impermeable enclosing walls of heat conductive material, withdrawing said gases, introducing a cooling stream of gas inert to such hot mineral material into the stream, and circulating cooling water in contact with the outside surface of said enclosing walls.

2. Method of cooling hot mineral granular materials comprising the step of conducting heated granules and the hot gases associated therewith into the form of an extended stream, causing the stream to flow in contact with impermeable enclosing walls of heat conductive material, withdrawing said gases, introducing a cooling stream of gas inert to such hot mineral material into the stream, and circulating a cooling gas in contact with the outside surface of said enclosing walls.

3. Method of cooling hot mineral granular materials comprising the step of conducting heated granules and the hot gases associated therewith into the form of an extended stream, causing said stream to flow in contact with enclosing walls of heat conductive material, and circulating a cooling medium in contact with the outside surface of said enclosing walls and regulating the flow of said granular stream by changes in the temperature of the cooling medium.

4. Method of cooling hot mineral granular materials comprising the step of conducting heated granules and the hot gases associated therewith into the form of an extended stream, causing said stream to flow in contact with enclosing walls of heat conductive material, and circulating a cooling medium in contact with the outside surface of said enclosing walls and regulating the flow of said granular stream by changes in the temperature of the cooling medium.

5. Apparatus for cooling hot mineral granular materials comprising a tube of relatively small cross-section, means for delivering hot granular materials to and through the tube out of contact with reactive gases, means for withdrawing the granular materials from the outlet end of the tube, means for circulating a cooling fluid medium in contact with the outside surface of the tube and means controlled by changes in the temperature of the cooling fluid medium for controlling the flow of granular material from the tube.

6. Apparatus for cooling hot mineral granular materials comprising a tube of relatively small cross-section, means for delivering hot granular materials to and through the tube out of contact with reactive gases, means for withdrawing the granular materials from the outlet end of the tube, means for circulating a cooling fluid medium in contact with the outside surface of the tube, and means for controlling the flow of the granular material from the tube by changes in the temperature of the granular material.

7. Apparatus for cooling hot mineral granular materials, comprising a tube of relatively small cross-section, means for delivering hot granular materials to and through the tube out of contact with reactive gases, means for withdrawing the granular materials from the outlet end of the tube, means for circulating a cooling fluid medium in contact with the outside surface of the tube, and means for controlling the flow of the granular material from the tube by changes in the temperature of the cooling medium.

CLARENCE L. COLBERT.